United States Patent
Coffman et al.

(10) Patent No.: US 9,059,574 B2
(45) Date of Patent: Jun. 16, 2015

(54) HAND GRIP CONNECTOR FOR CABLE PROTECTORS

(75) Inventors: Daniel Coffman, Northglenn, CO (US);
Brad Prososki, Thornton, CO (US);
James P. Fonte, Arvada, CO (US)

(73) Assignee: CHECKERS INDUSTRIAL PRODUCTS, LLC, Broomfield, CO (US)

( * ) Notice: Subject to any disclaimer, the term of this patent is extended or adjusted under 35 U.S.C. 154(b) by 196 days.

(21) Appl. No.: 13/572,270

(22) Filed: Aug. 10, 2012

(65) Prior Publication Data

US 2014/0041936 A1     Feb. 13, 2014

(51) Int. Cl.
*H02G 9/04* (2006.01)
*H02G 3/04* (2006.01)
*H02G 3/06* (2006.01)

(52) U.S. Cl.
CPC .............. *H02G 9/04* (2013.01); *H02G 3/0418* (2013.01); *H02G 3/0437* (2013.01); *H02G 3/0608* (2013.01)

(58) Field of Classification Search
None
See application file for complete search history.

(56) References Cited

U.S. PATENT DOCUMENTS

| | | | | | |
|---|---|---|---|---|---|
| 4,779,902 | A | * | 10/1988 | Lee | 285/260 |
| 5,780,773 | A | * | 7/1998 | Wakamatsu | 174/72 C |
| D412,490 | S | * | 8/1999 | Henry | D13/155 |
| D413,490 | S | * | 9/1999 | Pinkas | D7/634 |
| D429,695 | S | * | 8/2000 | Henry | 74/27 |
| 6,878,881 | B1 | * | 4/2005 | Henry | 174/101 |
| 7,385,139 | B2 | * | 6/2008 | Lubanski | 174/97 |
| D583,771 | S | * | 12/2008 | Lubanski | D13/155 |
| 7,592,547 | B2 | * | 9/2009 | Lubanski | 174/101 |
| 7,838,772 | B2 | * | 11/2010 | Lubanski | 174/97 |
| 7,943,851 | B2 | * | 5/2011 | Lubanski | 174/97 |

OTHER PUBLICATIONS

Grip Guard—Cable Protectors, Cables Plus USA, Pending Patent (Patent # D413,818) from p. 1 (Jan. 11, 2000).*

* cited by examiner

*Primary Examiner* — Timothy Thompson
*Assistant Examiner* — Krystal Robinson
(74) *Attorney, Agent, or Firm* — Holland & Hart (57) ABSTRACT

A cable protector includes a base member, at least one channel, and at least one connector. The at least one channel extend between opposing first and second ends of the base member and is structured to house at least one cable. The at least one connector extends from a first end of the cable protector and includes a hand grip feature. The hand grip feature of the at least one connector may include a plurality of recesses or protrusions formed in a side surface of the at least one connector. The cable protector may also include at least one connector recess that includes a hand grip feature. The hand grip feature of the at least one connector recess may include a plurality of recesses or protrusions formed in a side surface of the at least one connector recess.

26 Claims, 8 Drawing Sheets

HAND GRIP CONNECTOR FOR CABLE PROTECTORS

BACKGROUND

Over the years, various devices and apparatuses have been developed in an effort to protect hoses, cables, wiring, and the like from physical damage. In particular, numerous cable protector designs have been developed to protect cabling extending across walkways, roadways, and construction sites from physical damage caused by pedestrians, vehicular traffic, and other such external elements. Cable protectors have also proven useful in helping to minimize the risk of pedestrians tripping over such cabling.

Conventional cable protectors typically include one or more channels extending in parallel between opposing ends of the cable protector to receive one or more cables. Side ramps may extend laterally outward from, or may be removably attachable to, the sides of the cable protector to allow vehicles and the like to roll over the top of the cable protector. A pair of connectors may extends from one end of the cable protector and fit in connector recesses formed in an end portion of an adjacent cable protector to releasable connect the cable protectors together. Some types of connectors include a dog bone shaped end and the connector recesses include a matching shape. The dog bone shape enhances a connection between the cable protectors.

SUMMARY

As will be described in greater detail below, the instant disclosure generally relates to a cable protector that includes a base member, at least one channel, and at least one connector. The at least one channel extend between opposing first and second ends of the base member and is structured to house at least one cable. The at least one connector extends from a first end of the cable protector and includes a hand grip feature.

The hand grip feature may include a plurality of recesses formed therein. The hand grip feature may include a plurality of protrusions. The at least one connector may include a top surface, a bottom surface, opposing side surfaces, and first and second ends, wherein the first end is connected to the base member, and the hand grip feature is formed in at least one of the side surfaces. The top and bottom surfaces may be substantially planar. The hand grip feature may include a plurality of spaced apart recesses. The hand grip feature may include a first number of recesses along a first of the side surfaces and a second number of recesses along a second of the side surfaces that is different than the first number. The opposing side surfaces may be arranged parallel to each other.

The cable protector may include at least one connector recess formed in a second end of the cable protector opposite the first end, wherein the at least one connector recess has a shape that mirrors an outer profile of the hand grip feature. The at least one connector recess may include first and second connector recesses formed in the second end of the base member. The connector recesses may include at least one hand grip feature.

The at least one connector may includes first and second connectors extending from the first end of the base member. The cable protector may include at least one ramp member connected to the base member, wherein the at least one connector extends from the at least one ramp member. The cable protector may include at least one connector recess formed in the at least one ramp member.

Another aspect of the present disclosure relates to a side ramp structured to be removably attachable to a side of a base member of a cable protector. The side ramp includes a first side, a second side, a first end, and a second end. The side ramp also includes at least one hand grip member extending from the first end and including a hand grip feature that facilitates grasping by a user's hand. The at least one hand grip member is configured to releasably connect the side ramp to a side ramp of an adjacent cable protector.

The hand grip feature may include a plurality of recesses along a length of the at least one hand grip member. The at least one hand grip member may include top and bottom surfaces and opposing first and second side surfaces, wherein the hand grip feature is formed in at least one of the first and second side surfaces. The side ramp may also include at least one connector recess formed in the second end of the side ramp, wherein the at least one connector recess has a shape that mirrors an outer profile of the at least one hand grip member.

A further aspect of the present disclosure relates to a cable protector system that includes a first and second cable protectors. The first cable protector includes a first base member, at least one channel extending between opposing ends of the first base member and structured to receive at least one cable, a first side ramp extending from a side of the first base member, a first connector extending from a first end of the first cable protector, the first connector having a hand grip feature, and a first connector recess formed in a second end of the first cable protector. The second cable protector includes a second base member, at least one channel extending between opposing ends of the second base member and structured to receive at least one cable, a second side ramp extending from a side of the second base member, a second connector extending from a first end of the second cable protector, the second connector having a hand grip feature, and a second connector recess formed in a second end of the second cable protector. The first connector recess is configured to receive the second connector to releasable connect the first and second cable protectors.

The hand grip feature of the first and second connectors may include a plurality of recesses that facilitate grasping of the first and second connectors by a user's hand. The first and second connector recesses may each include a hand grip feature, wherein the hand grip feature of the first connector includes a plurality of protrusions that mate with the plurality of recesses of the second connector. The plurality of recesses may have the same shape and size.

Another aspect of the present disclosure relates to a method of assembling a cable protector system. The method includes providing a first cable protector having a first base member, a first side ramp, at least one first connector having a hand grip feature, and at least one first connector recess, and providing a second cable protector having a second base member, a second side ramp, at least one second connector having a hand grip feature, and at least one second connector recess. The method also includes positioning the first cable protector relative to the second cable protector by grasping one of the hand grip features, and inserting the at least one second connector into the at least one first connector recess to releasably connect the first and second cable connectors together.

The hand grip feature may include a plurality of recesses that facilitate grasping of the first and second connectors by a user's hand when positioning the first cable protector relative to the second cable protector. The at least one first connector recess may have a shape that mirrors an outer profile of the at least one second connector, and inserting the at least one second connector into the at least one first connector recess includes moving the at least one second connector and at least one first connector recess vertically relative to each other.

Features from any of the above-mentioned embodiments may be used in combination with one another in accordance with the general principles described herein. These and other embodiments, features and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, one of skill in the art will understand that the exemplary embodiments described herein are not intended to be limited to the particular forms disclosed. Rather, the instant disclosure covers all modifications, equivalents, and alternatives falling within the scope defined by the appended claims.

DETAILED DESCRIPTION OF EXEMPLARY EMBODIMENTS

As will be described in greater detail below, the present disclosure generally relates to cable protectors and cable protector systems. Cable protector systems may include a plurality of cable protectors and other features such as ramps, corner pieces, handrails, etc., that are connected together. Various components of the cable protector system may be connected together with one or more connectors. The connectors may extend from an end or side surfaces of the component. The connectors may be inserted into mating connector recesses of an adjacent component.

One aspect of the present disclosure relates to providing the connectors and connector recesses with features that make it easier to grasp and handle the connectors and connector recesses by a user. In one example, the connectors and connector recesses include at least one hand grip feature. The hand grip feature may include a plurality of recesses or grooves, or a plurality of protrusions. The hand grip feature may include portions may align with a typical palm, finger or thumb placement of a user when grasping the connector. The hand grip feature of the connector and connector recesses may provide improved gripping of the connector and connector recesses by the user when handling the component of the cable protector system, such as when lifting the component or adjusting a position of the component relative to an adjacent component.

In one example, the component of the cable protector system is a first cable protector having at least one connector extending from an end or side surface thereof. An adjacent second cable protector includes at least one connector recess sized to receive the connector of the first cable protector. The connector recess in the second cable protector may have a shape that mirrors or corresponds to an outer profile of the connector of the first cable connector. The connector is inserted into the connector recess to provide a releasable connection between the first and second cable protectors. In some configurations, the connector is inserted into the recess in a vertical direction. Once inserted into the recess, the connector limits lateral and longitudinal movement of the first and second cable protectors relative to each other.

Another example relates to a first cable protector that includes at least first and second connectors extending from an end surface thereof. Each of the connectors includes a hand grip feature such as a plurality of recesses or grooves, or a plurality of protrusions. The plurality of recesses may each have the same shape and/or size. The plurality of protrusions may have the same shape and/or size. The hand grip feature may provide improved comfort and gripping for the user when grasping the connectors. A second cable protector includes at least first and second recesses formed in an end portion thereof. The first and second connector recesses are sized to receive the first and second connectors of the first cable protector. The first and second recesses may include hand grip features that match the hand grip features of the first and second connectors. The first and second connectors are inserted vertically into the first and second connector recesses to provide a releasable connection between the first and second cable protectors.

The first and second cable protectors may each include a base portion having a plurality of channels formed therein, which are sized to receive cables. The cable protectors may also include at least one ramp portion that extends along a side surface of the base portion. A cover member may be mounted to the base portion to at least partially cover the channels. The connectors may be formed in at least one of the base portion and side ramp. Likewise, the connector recesses may be formed in at least one of the base portion and side ramp. In some examples, the side ramps are integrally formed with the base portion. In other examples, the ramp members are formed as separate pieces from the base portion and are assembled with the base portion as part of forming or assembling the cable protector.

The connectors and connector recesses disclosed herein may provide multiple functions (e.g., a dual function). One of these functions may be to releasably connect together multiple components of a cable protector system. Another function may relate to handling the components that carry the connectors and connector recesses. For example, handling the component may include picking up, moving, or adjusting a position of the component relative to another component of the cable protector system. The connectors and connector recesses may include features that provide improved ergonomics when handling (e.g., moving) the component. The improved ergonomics may result from rounded or contoured handgrip features that enhance grasping of the connectors and connector recesses by the user's hand. The handgrip features may be formed along only portions of the connectors and connector recesses such as, for example, along opposing side surfaces, along one or both of the top and bottom surfaces of the connectors, along or structure adjacent to the connector recesses, or along an end surface that spans between the side surfaces. The connectors and connector recesses may be referred to as hand grip members or handgrips of the cable protector.

Figure 1:
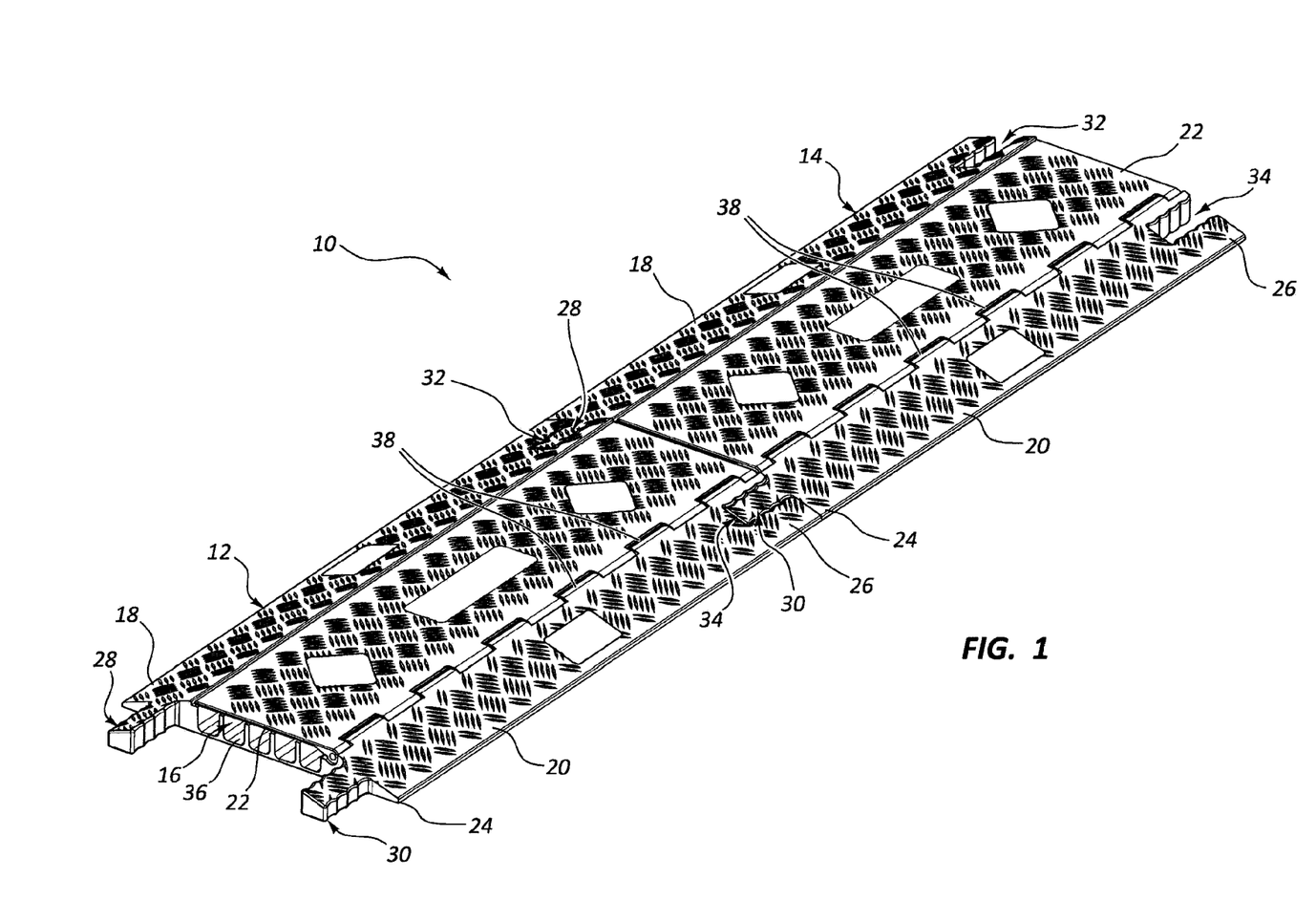
FIG. 1 is a perspective view of an example cable protector system in accordance with the present disclosure.
Figure 2:
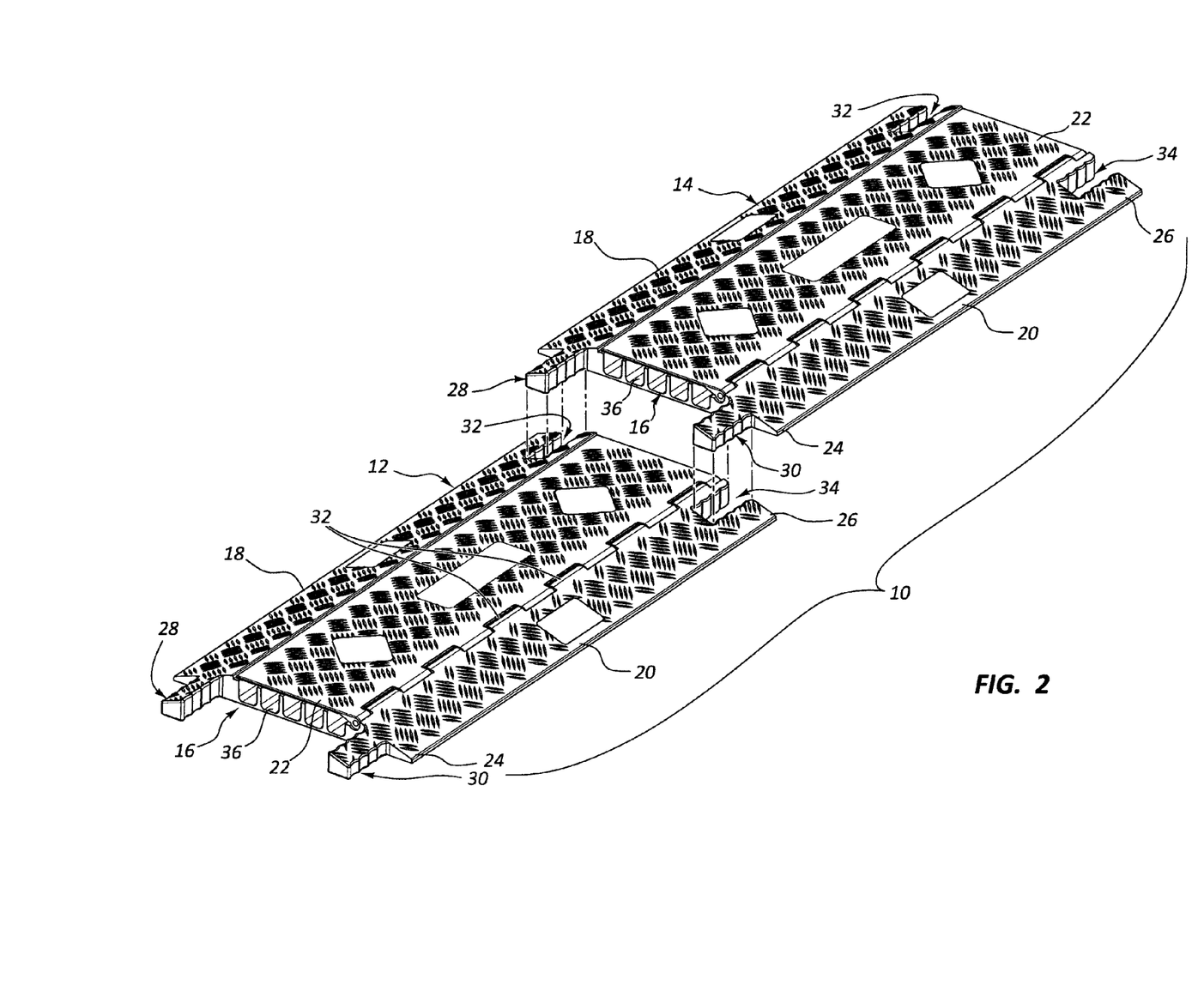
FIG. 2 is an exploded perspective view of the cable protector system of FIG. 1.
Figure 3:
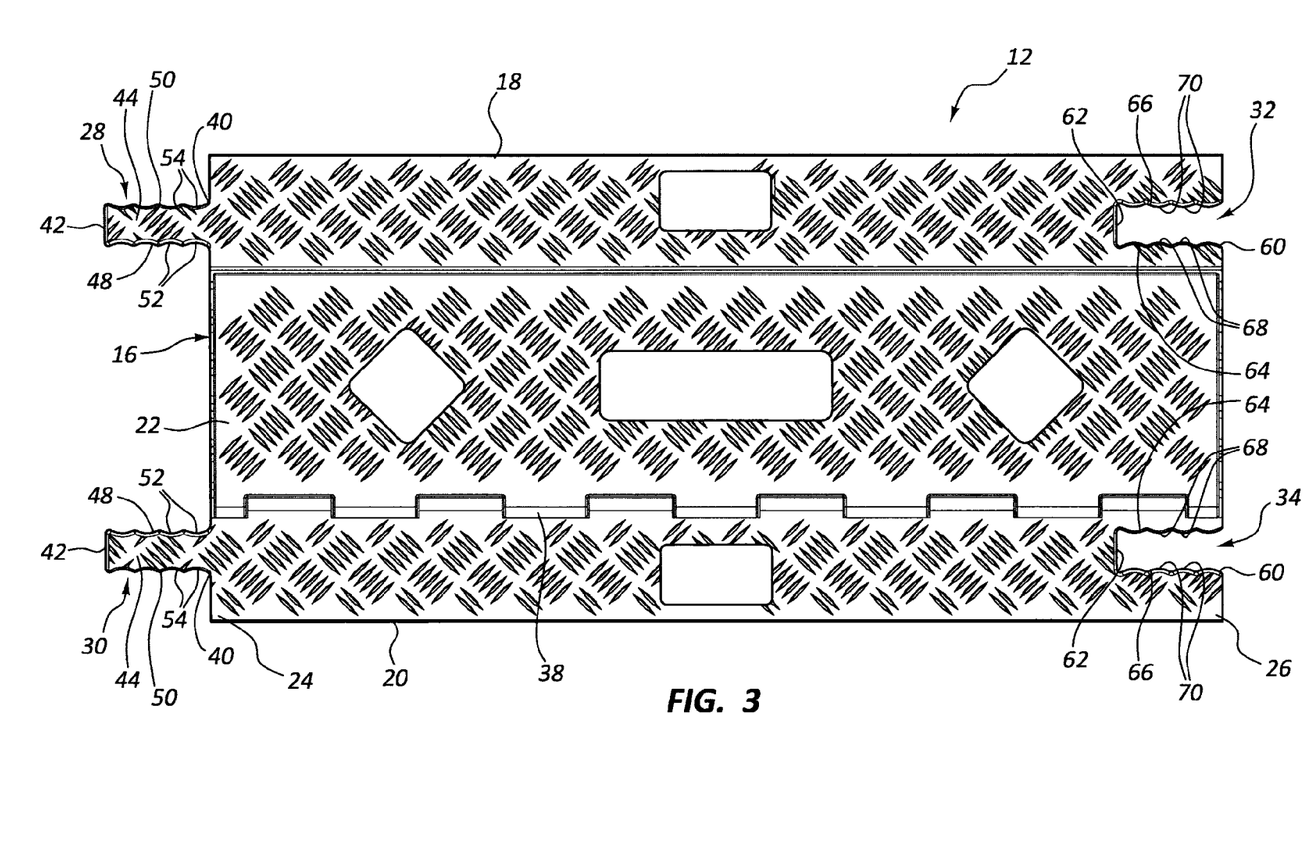
FIG. 3 is a top view of one of the cable protectors of FIG. 1.

Referring now to FIGS. 1-2, an example cable protector system 10 is shown including first and second cable protectors 12, 14. Each of the first and second cable protectors 12, 14 includes a base member 16, a first side ramp 18, a second side ramp 20, and a cover 22. Each of the first and second cable protectors 12, 14 includes first and second ends 24, 26.

The first and second cable protectors 12, 14 are connected together with first and second connectors 28, 30 that are releasably inserted in first and second connector recesses 32, 34, respectively. FIG. 1 shows the cable protector system 10 assembled with the first and second connectors 28, 30 of the second cable protector 14 inserted in the first and second connector recesses 32, 34 of the first cable protector 12. FIG. 2 shows the first and second cable protectors 12, 14 separated from each other with the first and second connectors 28, 30 of the second cable protector 14 aligned for vertical insertion into the first and second connector recesses 32, 34 of the first cable connector 12. Other cable protectors and components of the cable protector system 10 may be connected to the first and second connectors 28, 30 of the first cable protector 12 and the first and second connector recesses 32, 34 of the second cable protector 14.

Referring now to FIGS. 3-8, the first cable protector 12 is shown and described in further detail. The second cable protector 14 may include the same or similar features as the first cable protector 12, which is described with reference to FIGS. 3-8.

The base member 16 includes a plurality of channels 36 that extend between the first and second ends 24, 26. The cover 22 is connected to the base member 16 with a hinge 38. The cover 22 may pivot between the closed position shown in FIGS. 3-8 and an open position (not shown) in which the channels 36 are accessible from above as well as from the first and second ends 24, 26.

The first and second side ramps 18, 20 are connected to the base member 16 along opposing sides of the base member 16. The first and second side ramps 18, 20 are shown integrally formed as a single piece with the base member 16. Other embodiments may include at least one of the first and second side ramps 18, 20 being formed as a separate piece that is assembled with the base member 16. Other cable protector designs having different base members 16 and first and second side ramps 18, 20 may benefit from the connector and connector recess hand grip features disclosed herein.

The first and second connectors 28, 30 include first and second ends 40, 42, top and bottom surfaces 44, 46, first and second side surfaces 48, 50, inner recesses 52 and outer recesses 54. The inner recesses 52 are formed along the first side surface 48. The outer recesses 54 are formed along the second side surfaces 50. The inner and outer recesses 52, 54 may be spaced apart along the length of the first and second connectors 28, 30. The inner and outer recesses 52, 54 may have a contoured shape. The inner and outer recesses 52, 54 may have a shape and size that corresponds to at least one of a typical space between and shape of fingers of a user's hand. One or more of the inner and outer recesses 52, 54 may correspond to the location of a thumb of the user's hand when the user is grasping the first and second connectors 28, 30.

In some arrangements, the inner and outer recesses 52, 54 may be characterized as protrusions rather than recesses or grooves. The features along the first and second side surfaces 48, 50 may be referred to as discontinuities, contoured surfaces, hand grip features, grasping features, or finger grip or thumb grip features.

Typically, the first and second side surfaces 48, 50 are arranged parallel to each other along an entire length of the first and second connectors 28, 30 between the first and second ends 40, 42. In other arrangements, the first and second side surfaces 48, 50 may be tapered toward or away from each other along their lengths.

The inner and outer recesses 52, 54 are shown in the figures provided along the first and second side surfaces 48, 50. The top and bottom surfaces 44, 46 are substantially planar and void of any recesses, grooves, protrusions, discontinuities or other features that might be characterized as hand grip features. Other embodiments may include one or more hand grip feature along one or both of the top and bottom surfaces 44, 46. Any desired hand grip feature may be formed in one of the top and bottom surfaces 44, 46 to enhance ergonomics and other benefits of the connectors disclosed herein.

The top surface 44 is typically arranged parallel with the top surface of the first and second side ramps 18, 20, as shown in at least FIGS. 5-8. The bottom surface 46 is typically aligned parallel with a bottom surface of the base member 16 and bottom surfaces of the first and second side ramps 18, 20 (see FIGS. 5-8). Any hand grip features formed in the top and bottom surfaces 44, 46 typically do not extend vertically above the top surfaces of the first and second side ramps 18, 20 or below the bottom surfaces of the base member 16 and first and second side ramps 18, 20.

The first and second connectors 28, 30 are shown in the figures extending longitudinally from the first end 24. The first and second connector 28, 30 may extend in a length direction of the first cable protector 12. In some arrangements, the first and second connectors 28, 30 are integrally formed with the first and second side ramps 18, 20, respectively. In other arrangements, the first and second connectors 28, 30 are positioned at other locations on the first cable protector 12 and may be connected directly to, for example, to the base member 16. In other examples, the first and second connectors 28, 30 are formed as separate pieces that are separately mounted or connected to at least one of the base member 16 and first and second side ramps 18, 20.

The first and second connector recesses 32, 34 may include first and second ends 60, 62, first and second side surfaces 64, 66, and inner and outer protrusions 68, 70. The first and second connector recesses 32, 34 may have a length that extends from the first end 60 to the second end 62. The inner protrusions 68 are formed along the first side surface 64. The outer protrusions 70 are formed along the second side surfaces 66.

An outer profile of the first and second connector recesses 32, 34 as viewed from above (see FIG. 3) or below (see FIG. 4) substantially matches an outer profile of the first and second connectors 28, 30 as viewed from above (see FIG. 3) or below (see FIG. 4). This correspondence between the outer profile shapes of the first and second connectors 28, 30 and the first and second connector recesses 32, 34 may promote vertical insertion of the first and second connectors 28, 30 into the first and second connector recesses 32, 34, respectively, as described above with reference to FIGS. 1-2. Mating of the inner and outer protrusions 68, 70 within the inner and outer recesses 52, 54, as shown in FIG. 1, limits lateral as well as longitudinal or axial movement of the first and second cable protectors 12, 14 relative to each other.

The inner and outer protrusions 68, 70 may be spaced apart along a length of the first and second connector recesses 32, 34 between the first and second end 60, 62. The inner and outer protrusions 68, 70 may have generally contoured shapes. In some examples, the inner and outer protrusions 68, 70 may be characterized as a plurality of recesses rather than a plurality of protrusions.

The first and second side surfaces 64, 66 may be arranged generally parallel with each other. Other examples may include the first and second side surfaces 64, 66 arranged at non-parallel positions relative to each other, such as being tapering toward or away from each other between the first and second ends 60, 62. Typically, whatever shape (e.g., profile as viewed from above) the first and second connectors 28, include is mirrored for the first and second connector recesses 32, 34.

At least some surfaces of the first and second connector recesses 32, 34 provide improved ergonomics for a user's hand that contact surfaces of the first and second connector recesses 32, 34 while handling (e.g., lifting, moving or repositioning) the first cable protector 12. In one example, the user inserts the fingers of one hand into one of the first and second connector recesses 32, 34 and wraps the fingers around one of the first and second side surfaces 64, 66 as part of grasping the first cable protector 12. The inner and outer protrusion 68, 70 may be hand grip features that provide improved comfort and gripping of the user's hands with that portion of the first cable protector 12. The user may grasp either the first side surface 64 or the second side surface 66 depending on the direction in which the user's hand is inserted within the first and second connector recesses 32, 34.

The inner and outer protrusion 68, 70 are shown in the figures extending along only the first and second side surfaces 64, 66. In other examples, the first and second connector recesses 32, 34 include hand grip features extend to other surfaces of the first cable protector 12 (e.g., adjacent to the first and second connector recesses 32, 34), for example, along a portion of the first and second ends 60, 62, along the top surfaces of the first and second side ramps 18, 20, or along the bottom surfaces of the first and second side ramps 18, 20.

The first and second connectors 28, 30 may be arranged at any desired position along the first and second side surfaces 48, 50. The first and second connector recesses 32, 34 may include any desired number of inner and outer protrusions 68, 70 positioned at any location along the first and second side surfaces 64, 66.

Figure 4:
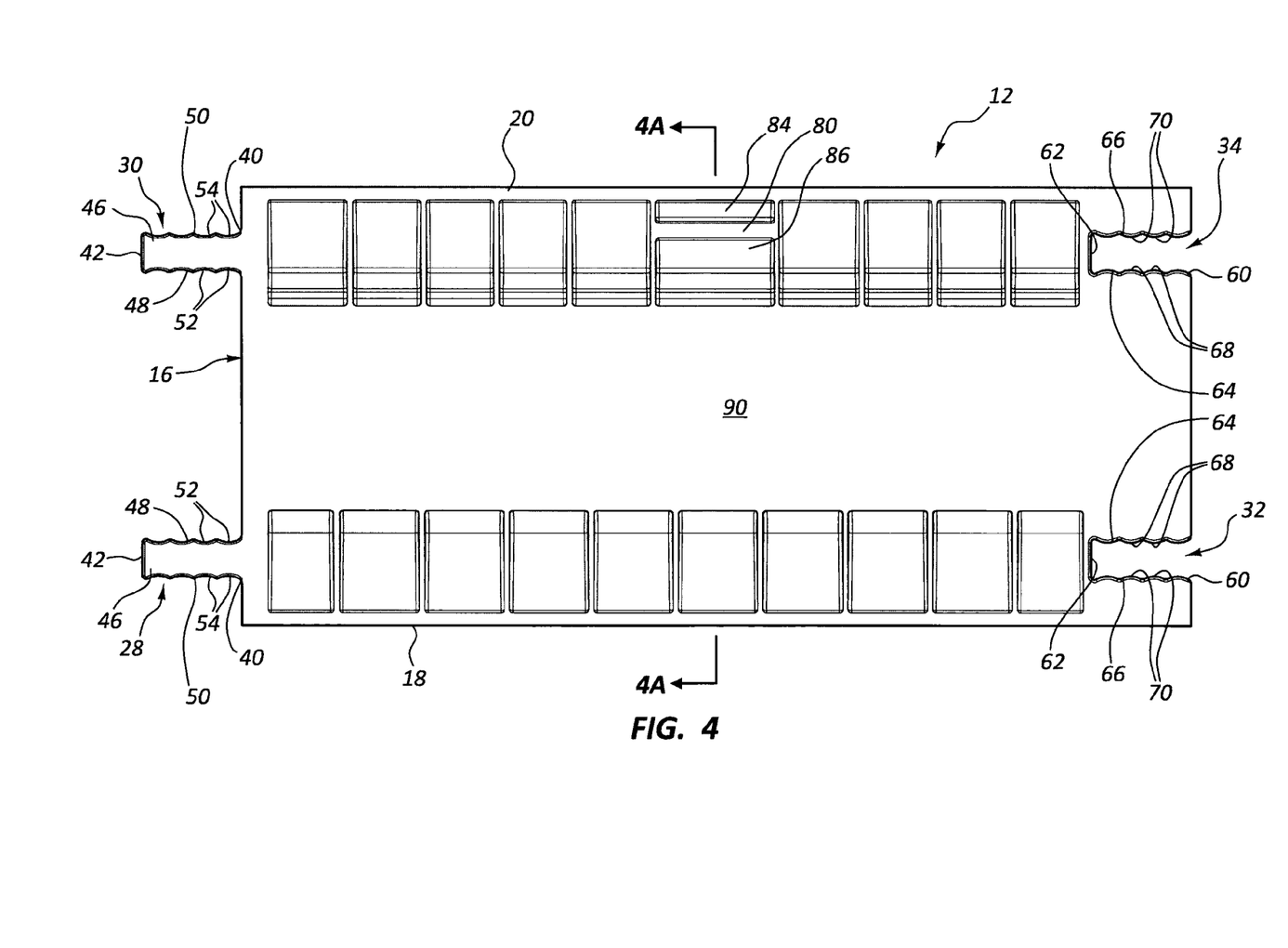
FIG. 4 is a bottom view of the cable protector of FIG. 3.
Figure 4A:
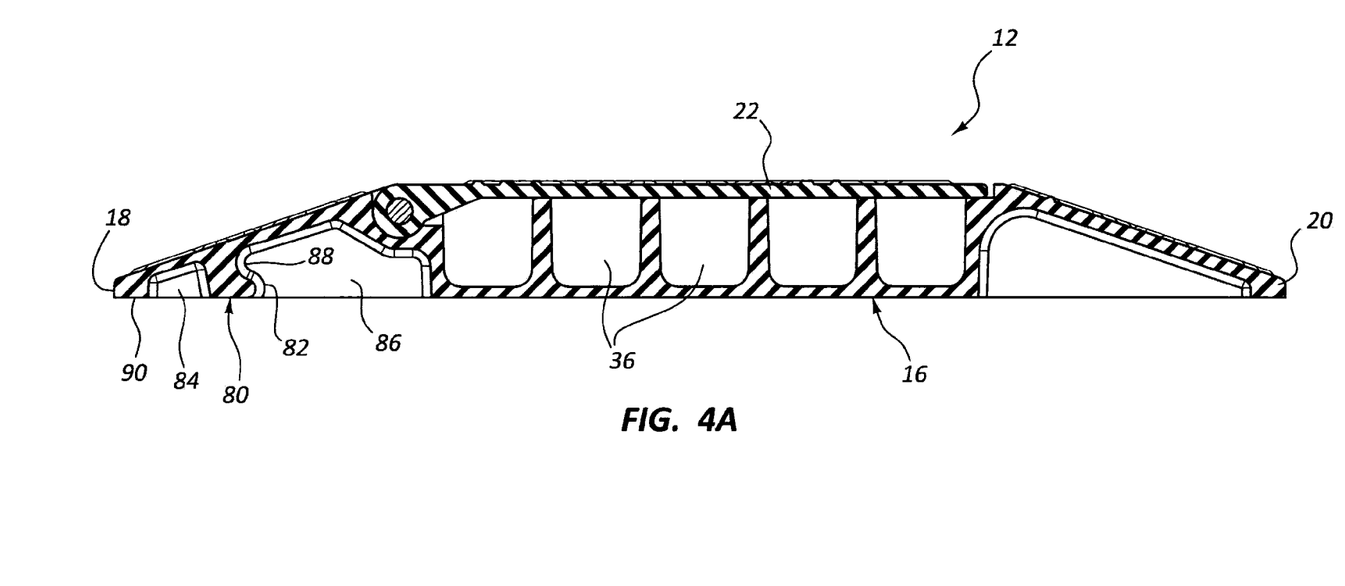
FIG. 4A is a cross-sectional view of the cable protector of FIG. 4 taken along cross-section indicators 4A-4A.
Figure 5:
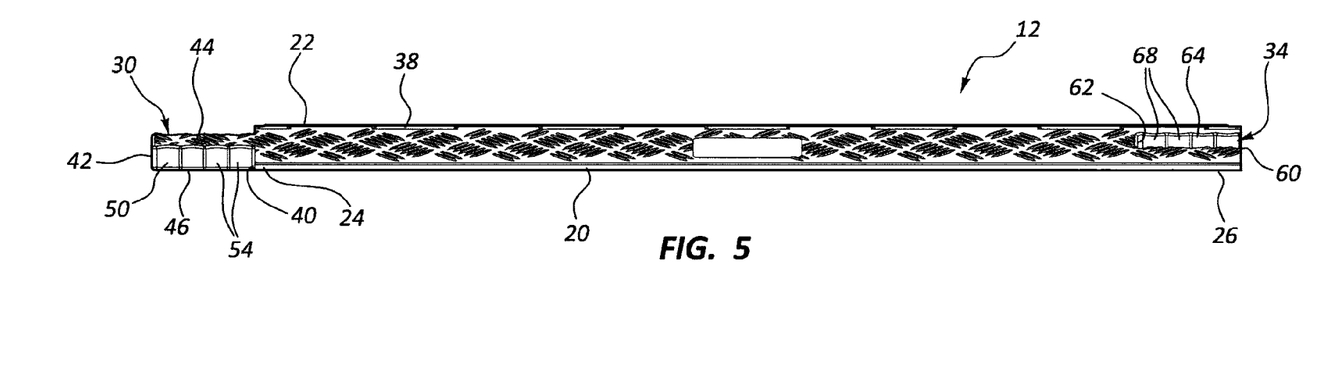
FIG. 5 is a right side view of the cable protector of FIG. 3.
Figure 6:
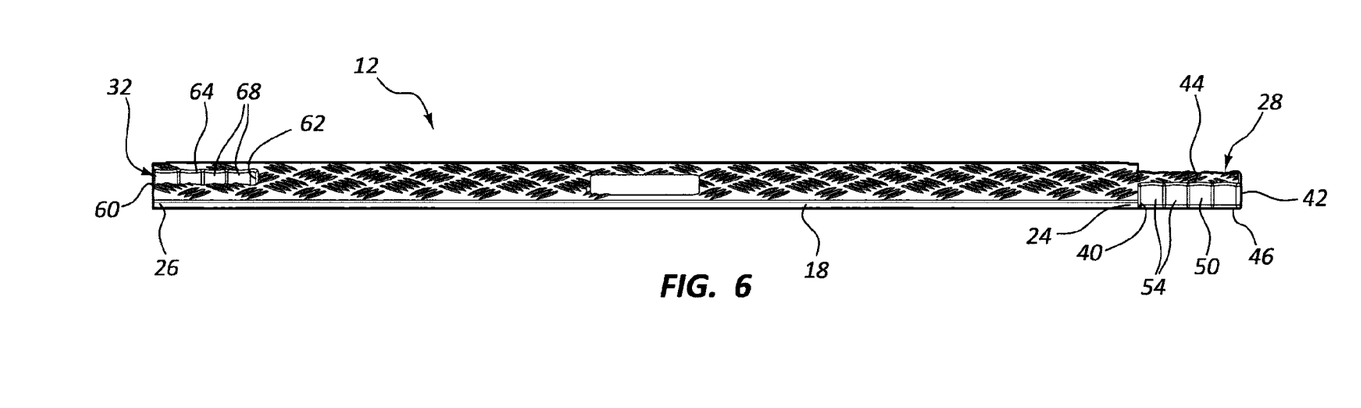
FIG. 6 is a left side view of the cable protector of FIG. 3.
Figure 7:
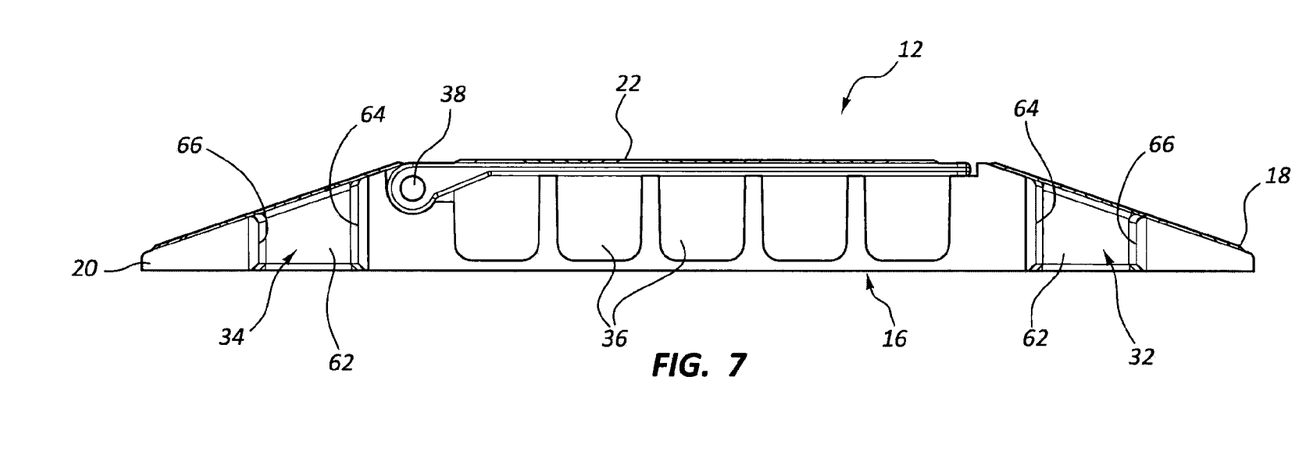
FIG. 7 is an end view of the cable protector of FIG. 3.
Figure 8:
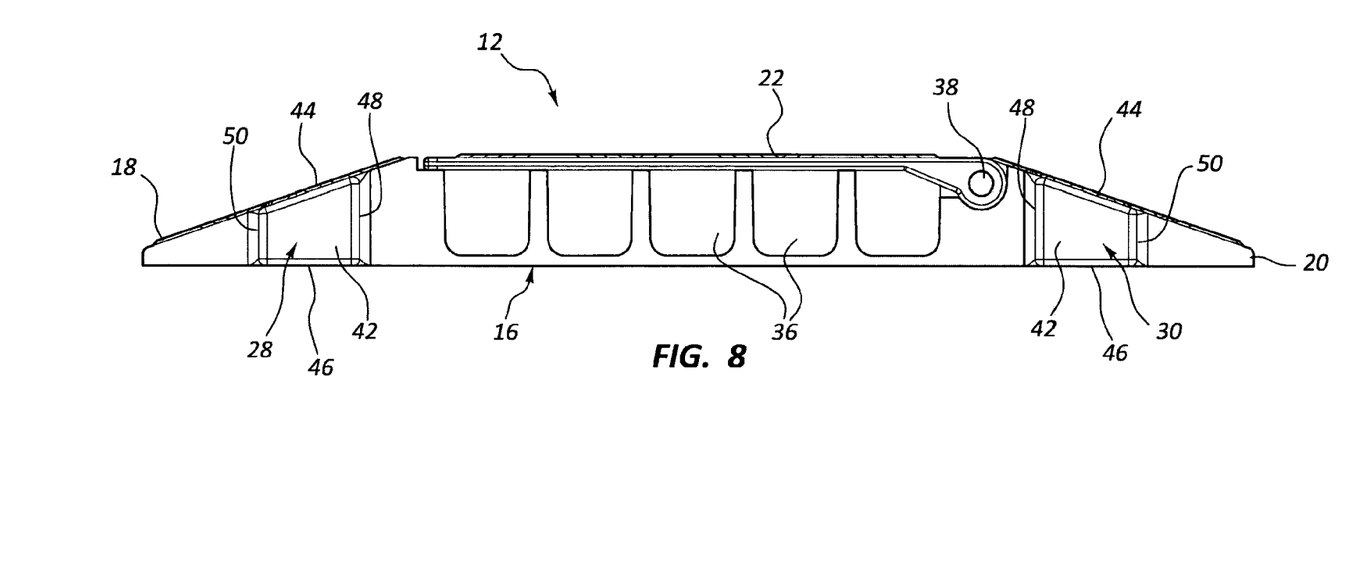
FIG. 8 is an opposite end view of the cable protector of FIG. 3.

The cable protector 12 shown in FIGS. 1-8 may include at least one hand grip feature positioned along a bottom surface 90 of the cable protector 12 (e.g., see FIGS. 4 and 4A). For example, the hand grip feature may be formed in any one of the base member 16, first and second side ramps 18, 20, and the first and second connectors 28, 30.

FIGS. 4 and 4A show a bottom hand grip 80 formed in the first side ramp 18. The bottom hand grip 80 may be positioned at any location along a length of the cable protector 12 such as at approximately a mid-point along a length of the cable protector 12. The bottom hand grip 80 may be positioned on the cable protector 12 on the same side as the hinge 38 of cover 22 so that the cover 22 remains closed when the cable protector 12 is oriented vertically upright when being carried by the bottom hand grip 80.

The bottom hand grip 80 includes a grip surface 82 positioned between first and second pocket portions 84, 86. The grip surface 82 may include a recess portion 88. The grip surface 82 may be provided on a protrusion feature that extends into the cutout along the bottom side 90, thereby defining the first and second pocket portions 84, 86. The grip surface 82 may include a contoured portion. The contoured aspects of the grip surface 82, alone or in combination with the recess portion 88, may provide improved ergonomics and gripping by an operator's hand that grasps the bottom hand grip 80. The recess portion 88 may provide additional space for the fingers of the user's hand when grasping the bottom hand grip 80. The recess portion 88 may provide a surface directed at least in part toward the bottom surface 90 that the user's fingers may apply a force against to capture a portion of the bottom hand grip 80 between the user's fingers and a palm of the user's hand.

The cable protector 12 may include a plurality of the bottom hand grips 80 positioned at any desired location on the cable protector 12. The bottom hand grips 80 may be used alone, such as in the embodiment of FIGS. 4-4A, or may be used in combination with other hand grip features. In one example, the bottom hand grips 80 are positioned along the bottom surface of the first and second connectors 28, 30 or adjacent to one of the first and second connector recesses 32, 34.

Figure 9:
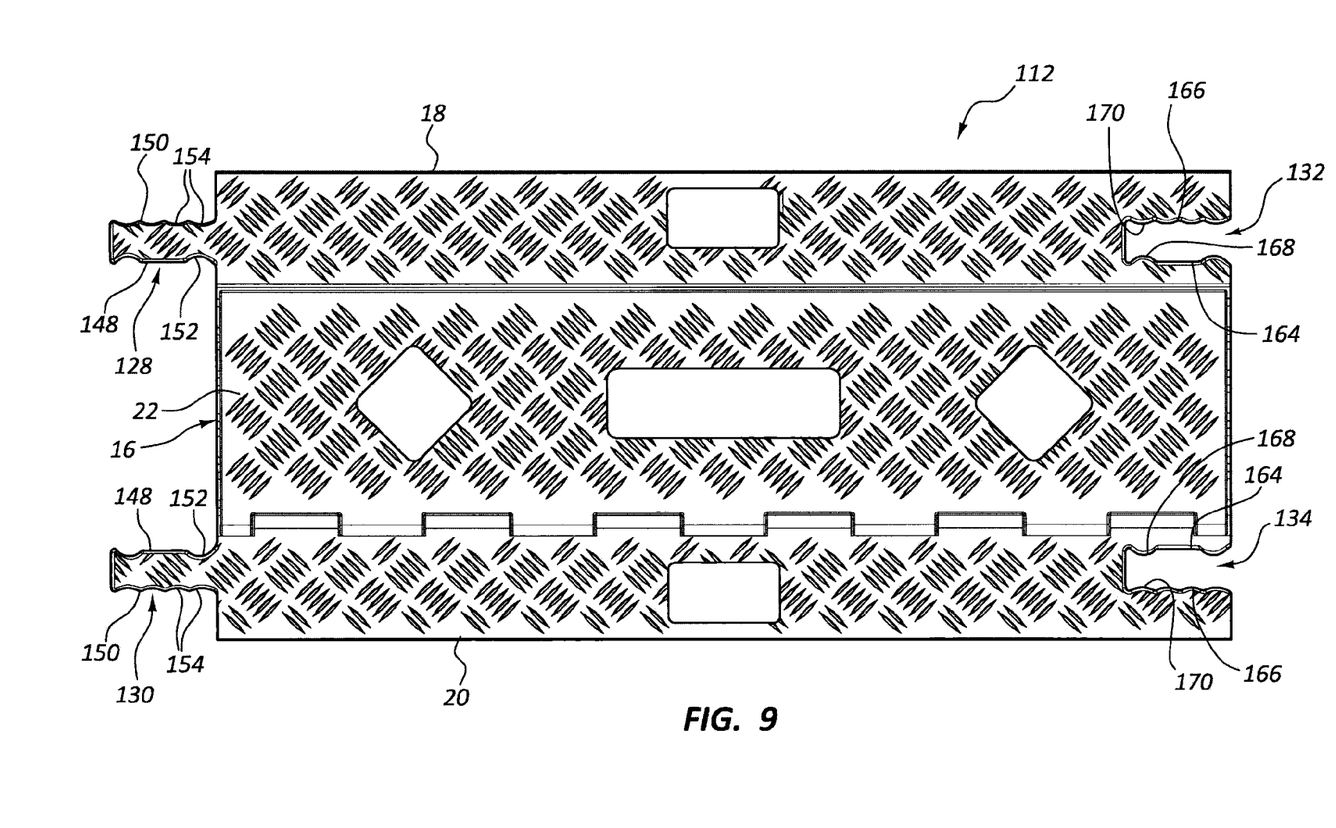
FIG. 9 is top view of another example cable protector in accordance with the present disclosure.

FIG. 9 shows another example cable protector 112 including first and second connectors 128, 130 and first and second side connector recesses 132, 134 that have different numbers of recesses and protrusions along the side surfaces of the connectors and connector recesses. The first and second connectors 128, 130 include two inner recesses 152 along the first side surface 148 and four outer recesses 154 along the second side surface 150. The first and second connector recesses 132, 134 include two inner protrusions 168 along the first side surface 164, and four outer protrusions 170 along the second side surface 166.

Any desired number of recesses and protrusions, or other hand grip features, may be positioned on the first and second connectors and first and second connector recesses at any desired location to provide the intended hand grip features for the cable protectors.

One aspect of the present disclosure relates to a method of assembling in a cable protector system, wherein the cable protector system includes at least first and second cable protectors each having at least one connector having a hand grip feature and at least one connector recess having a hand grip feature. A user may move one or both of the first and second cable protectors by grasping the hand grip features of the connectors or connector recesses. The connector of one cable protector is aligned with the connector recess of the other cable protector. The connector is inserted into the connector recess. The hand grip features of the connectors and connector recesses may provide improved comfort and gripping when handling the cable protectors, and may also be used to help secure the cable protectors together. The hand grip features of the connectors and connector recesses may correspond to each other in shape and/or size so that the connectors mate with the connector recesses to provide a releasable connection between the cable protectors. The connectors may be inserted vertically into the recess. Once inserted, an interface between the connectors and connector recesses restricts lateral and/or longitudinal movement of the cable protectors relative to each other.

Another aspect of the present disclosure relates to a method of making a cable protector configured for improved handling by a user. The cable protector may include a base member, first and second side ramps extending along the opposing side edges of the base member, a cover that provides access to a plurality of channels formed in the base member, at least one connector extending from one end of the cable protector, and at least one connector recess formed in an opposing end of the cable protector. The at least one connector and the at least one connector recess may be integrally formed with a portion of the cable protector, such as the side ramps or the base member. The at least one connector and the least one connector recess may include hand grip features. The hand grip features may include contoured surfaces. The hand grip features may include at least one groove or recess, or at least one protrusion. The hand grip features may be spaced apart along a length of the at least one connector and the at least one connector recess. The hand grip features may enhance a releasable connection of the cable protector to an adjacent component of a cable protector system such as, for example, a second cable protector.

The method may include forming the hand grip features along at least one surface of the at least one connector and the at least one connector recess. The hand grip features may be formed along a plurality of surfaces of the at least one connector and a plurality of surfaces of the at least one connector recess. The surfaces upon which the hand grip features are formed may be surfaces that are hidden or enclosed when the cable protector is assembled with another component of the cable protector system such as, for example, a second cable protector. Other surfaces of the at least one connector and the at least one connector recess, which are exposed after assembly (e.g., a top surface or a bottom surface), may be void of hand grip features.

Although the various elements of the exemplary cable protector systems illustrated in FIGS. 1-9 have been described and illustrated with a certain degree of particularity, each element in these exemplary systems may be formed in any number of suitable shapes and sizes. For example, one or more of the elements described and illustrated in FIGS. 1-9 may be integrally formed with, as opposed to being removably attached to, one another.

The exemplary cable protector systems and ramp structures illustrated in FIGS. 1-9 may also be adapted to house any number of cables and/or to extend over roadways and walkways of varying lengths. For example, any number of cable protectors in these exemplary systems may be removably attached together in a side-by-side fashion so as to house greater or lesser numbers of cables. Specifically, connectors formed on the side of a first cable protector may be removably inserted into apertures defined in the side of a second cable protector to removably attach the two cable protectors together in a side-by-side fashion. Additional cable protectors may be attached to either side of this assembly to increase the cable-housing capacity of the system as needed.

Similarly, any number of cable protectors may be removably attached together in an end-to-end fashion as shown in FIG. 1 to extend the cable protector system across roadways or walkways of varying widths. For example, one or more cable protectors may be removably attached together in an end-to-end fashion by one or more ramps. Additionally or alternatively, cable protectors may be removably attached together in an end-to-end fashion using one or more end connectors provided on opposing ends of the cable protectors. As will be appreciated by those of skill in the art, mixing and matching the various "building blocks" of these exemplary cable protector systems in this manner enables a user to form a system capable of housing any number of cables and/or extending over roadways and walkways of varying lengths. The flexibility of the system as a whole is thus increased, resulting in greater ease of use and interchangeability of parts.

In addition, although the various cable protector embodiments illustrated herein have been described as having one or more connectors formed on a first end of the cable protector and one or more connector recesses formed on an opposing end of the cable protector, various alternative arrangements and configurations fall within the scope of the instant disclosure. For example, the cable protectors may be formed with connectors on both end, or may have connector recesses defined in each of its ends. Similarly, the cable protectors may be formed such that a connector is formed on the same end as a connector recess.

The elements of the exemplary cable protector systems described and/or illustrated herein may also be formed of any material or combination of materials. For example, the cable protectors and side ramps described and illustrated herein may be molded of a rigid, high-strength plastic material capable of withstanding repeated loadings and stresses. In addition, plastic plating or gripping may be formed on the upper surfaces of one or more of these elements to improve traction for pedestrians or vehicles traveling over the cable protector system.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A cable protector, comprising:
   a base member;
   at least one channel extending between opposing first and second ends of the base member and structured to house at least one cable;
   at least one connector extending from a first end of the cable protector, the at least one connector having a hand grip feature, an end surface, and a first side surface, the hand grip feature having a length configured to span the width of a grasping user's hand;
   a plurality of recesses formed along the first side surface of the hand grip feature between the base member and the end surface, the plurality of recesses having a shape and size that corresponds to fingers of a user's hand.

2. The cable protector of claim 1, wherein the hand grip feature includes a plurality of protrusions.

3. The cable protector of claim 1, wherein the at least one connector includes a top surface, a bottom surface, a second side surface, and first and second ends, the second side surface opposing the first side surface of the at least one connector, the first end connected to the base member, and the hand grip feature being formed in the first and second side surfaces.

4. The cable protector of claim 3, wherein the top and bottom surfaces are substantially planar.

5. The cable protector of claim 3, wherein the plurality of recesses are spaced apart to match a finger spacing of the user's hand.

6. The cable protector of claim 5, wherein the hand grip feature includes a first number of recesses along the first side surface and includes a second number of recesses along the second side surface, the second number being different from the first number.

7. The cable protector of claim 3, wherein the first and second side surfaces are arranged parallel to each other.

8. The cable protector of claim 1, further comprising at least one connector recess formed in a second end of the cable protector opposite the first end, the at least one connector recess having a shape that mirrors an outer profile of the hand grip feature.

9. The cable protector of claim 8, wherein the at least one connector recess includes first and second connector recesses formed in the second end of the base member.

10. The cable protector of claim 1, wherein the at least one connector includes first and second connectors extending from the first end of the base member.

11. The cable protector of claim 1, further comprising at least one ramp member connected to the base member, the at least one connector extending from the at least one ramp member.

12. The cable protector of claim 11, further comprising at least one connector recess formed in the at least one ramp member.

13. A side ramp structured to be removably attachable to a side of a base member of a cable protector, the side ramp comprising:
a first side, a second side, a first end, and a second end;
at least one hand grip member extending from the first end and including a hand grip feature having a length that facilitates grasping by each of the fingers of a user's hand, the hand grip feature having a first side surface facing only one of the first or second sides, the at least one hand grip member being configured to releasably connect the side ramp to a side ramp of an adjacent cable protector;
a plurality of grasping features formed along the first side surface of the hand grip feature, the plurality of grasping features having a shape and size that corresponds to at least one of: a spacing between each of the fingers of a user's hand and a shape to receive each of the fingers of a user's hand.

14. The side ramp of claim 13, wherein the plurality of grasping features include a plurality of recesses along the length of the at least one hand grip member.

15. The side ramp of claim 13, wherein the at least one hand grip member includes top and bottom surfaces and a second side surface opposing the first side surface, wherein the plurality of grasping features are formed in the first and second side surfaces.

16. The side ramp of claim 13, further comprising at least one connector recess formed in the second end of the side ramp, the at least one connector recess having a shape that mirrors an outer profile of the at least one hand grip member.

17. The side ramp of claim 13, further comprising a bottom hand grip formed in the side ramp and accessible along a bottom surface of the side ramp, the bottom hand grip including a contoured grasping surface.

18. A cable protector system, comprising:
a first cable protector comprising:
a first base member;
at least one channel extending between opposing ends of the first base member and structured to receive at least one cable;
a first side ramp extending from a side of the first base member;
a first connector extending from a first end of the first cable protector, the first connector having a hand grip feature, the hand grip feature extending from the first end of the first cable protector and being shaped to align with a palm and finger placement of a user grasping the hand grip feature;
a plurality of recesses formed along a side surface of the first connector, the plurality of recesses having a shape and size that corresponds to at least one of: a spacing between every finger of a user grasping the hand grip feature and a shape to receive every finger of a user grasping the hand grip feature;
a first connector recess formed in a second end of the first cable protector;
a second cable protector comprising:
a second base member;
at least one channel extending between opposing ends of the second base member and structured to receive at least one cable;
a second side ramp extending from a side of the second base member;
a second connector extending from a first end of the second cable protector, the second connector having a hand grip feature;
a second connector recess formed in a second end of the second cable protector;
wherein the first connector recess is configured to receive the second connector to releasably connect the first and second cable protectors.

19. The cable protector system of claim 18, wherein the hand grip features of each of the first and second connectors include a plurality of recesses that facilitate grasping of the first and second connectors by a user's hand.

20. The cable protector system of claim 19, wherein the first and second connector recesses each include a hand grip feature, the hand grip feature of the first connector including a plurality of protrusions that mate with the plurality of recesses of the second connector.

21. The cable protector system of claim 20, wherein the plurality of recesses have the same shape and size.

22. A method of assembling a cable protector system, comprising:
providing a first cable protector having a first base member, a first side ramp, at least one first connector having a first hand grip feature, and at least one first connector recess;
providing a second cable protector having a second base member, a second side ramp, at least one second connector having a second hand grip feature, and at least one second connector recess, wherein the second hand grip feature includes a plurality of recesses formed along a side surface of the at least one second connector, the plurality of recesses having a shape and size that corresponds with a shape to receive every finger of the grasping user's hand;
positioning the first cable protector relative to the second cable protector by grasping one of the first or second hand grip features;
inserting the at least one second connector into the at least one first connector recess to releasably connect the first and second cable connectors together.

23. The method of claim 22, wherein the first and second hand grip features each include a plurality of recesses that facilitate grasping of the first and second connectors by a user's hand when positioning the first cable protector relative to the second cable protector.

24. The method of claim 23, wherein the at least one first connector recess has a shape that mirrors an outer profile of the at least one second connector, and inserting the at least one second connector into the at least one first connector recess includes moving the at least one second connector and at least one first connector recess vertically relative to each other.

25. The cable protector of claim 1, further comprising a top surface, a bottom surface, and a hand grip formed in the bottom surface, the hand grip having a recess configured to receive fingers of a user's hand between the hand grip and the top surface.

26. The side ramp of claim 13, further comprising a bottom hand grip having a grip surface, the grip surface having a recess portion.

\* \* \* \* \*